United States Patent Office 3,245,805
Patented Apr. 12, 1966

3,245,805
SAUCE MIX AND METHOD OF
PREPARING SAME
John Joseph O'Neil, Tully, and Willis Henry Price, East
Syracuse, N.Y., assignors to The Borden Company,
New York, N.Y., a corporation of New Jersey
No Drawing. Filed July 12, 1963, Ser. No. 294,727
6 Claims. (Cl. 99—144)

This invention is directed to a sauce mix for foods. It has particular reference to a sauce mix for a potato casserole product to give it an appearance typical of a tomato and cheese pizza product and will be described in connection with such use.

When certified food colors, natural colors, or other conventional coloring materials are added to foods, the coloring material used is either soluble in the food itself, or the coloring material is added to a carrier which is soluble or dispersible in the food. The reason being that the color is introduced into a food to obtain a uniform color effect throughout the food product. Therefore, procedures for introducing water soluble and oil soluble colors or the plating of colors on dry powders such as sugar, have been well developed and are effective in achieving a uniform color distribution. However, such procedures are not suitable when it is desired to color a food product with discrete areas of various colors to give a non-uniform coloring to the food product.

The instant invention provides a sauce mix for coloring by adding a food grade coloring agent to a fat-emulsifier mixture and thoroughly blending the solidified fat mixture with the other ingredients of the sauce mix for a time sufficient to form discrete aggregates.

The instant invention will be described with reference to the preparation of a pizza potato casserole; that is a potato product comprising dehydrated potato slices and a dry sauce mix to which are added milk and/or water just prior to baking. The appearance desired for this product upon baking is a mixture of red, yellow and brown non-uniform coloring which duplicates the appearance obtained in pizza products made with tomato sauce and cheese.

The dehydrated potato slices used in the casserole are those conventionally used in formulating dehydrated potato casserole products and preferably measure 1/16 to 3/16 inch in thickness.

The coloring agent used is any one of food grade and can be a natural color, certified food color or mixture of coloring agents. For the purpose of providing the desired appearance to the pizza potato product of the present invention, vegetable color oleoresin paprika is preferred. It will be understood that various coloring materials do differ in composition so that the degree of blending as set forth below and suitable fat-emulsifier system may vary from that most suitable for paprika. However, the necessary conditions are readily ascertainable by mixing for a time sufficient to form the necessary aggregates.

The fat used to coat the coloring agent can be any edible hydrogenated vegetable oil such as Primex B. & C., a commercial fat derived from cottonseed oil, or any other edible vegetable or animal fat, preferably with a melting point of about 90° F. to 130° F.

The second component of the fat mixture is any edible food grade emulsifier which contains monoglycerides and/or diglycerides from animal or vegetable fats and is a plastic solid at ambient temperature. A specific example is Atmul 500, a commercial emulsifier derived from the glycerolysis of edible fats.

The other ingredients of the sauce mixture comprise flour and flavoring ingredients. The flavoring ingredients can be Parmesan and Romano cheese, salt, onion, spices, sugar, tomato crystals, monosodium glutamate, pepper, garlic powder and the like. One or all of the flavoring ingredients can be used in the sauce mix to give the flavor desired.

All of the ingredients of the sauce are in a dehydrated state. The proportion of ingredients of the sauce mix can be varied widely to give the desired appearance and flavor. It is important that sufficient fat be used to coat the coloring agent. In the case of the pizza potato product of the present invention from about 0.5 part to about 1 part by weight of oleoresin paprika can be used for every 100 parts by weight of dehydrated sauce mix; preferably 0.7 part by weight of oleoresin paprika. The fat-emulsifier mixture can vary in amount from about 6 parts to about 12 parts by weight for each part by weight of the paprika, and preferably 8 to 10 parts.

The sauce mix is prepared by first mixing together the coloring agent and melted fat-emulsifier mixture until the coloring agent is coated with the fat-emulsifier mixture. The resulting mixture is allowed to solidify, as by cooling, and the solidified fat mixture is then thoroughly blended with the flour and flavoring ingredients of the mix for a time sufficient to form aggregates comprising a combination of the fat mixture and sauce mix ingredients, the aggregates measuring from about 0.3 mm. to about 5 mm. in diameter and preferably, 0.5 mm. to about 2 mm. in diameter.

The degree and type of blending is important and must be carefully timed for, if underblending occurs, portions of the fat mixture remain as separate entities, and hence, a complete mixing has not been achieved and the coloring agent will appear as unattractive, concentrated areas of color in the finished product. Further, if overblending occurs, the fat mixture is so intimately and homogeneously blended in with the other ingredients that the color of the final baked potato casserole product, for example, becomes a uniform light brown rather than the desired combination of red-yellow-brown. If the fat mixture is added to the other sauce ingredients, as by spraying, or by a simple pouring of the melted fat mixture onto the dry ingredients, the color of the final baked pizza product is again a uniform light brown; there is no formation of the desired aggregates and there is no non-uniform coloring.

The proper amount of blending of the fat mixture containing the coloring agent with the remaining sauce mix ingredients is when the two are combined in aggregates measuring from about 0.3 mm. to about 5 mm. in diameter. The blending is preferably carried out in a ribbon blender and mixing continued until the proper size aggregates are formed. When this occurs the aggregates float to the top surface of the reconstituting liquid and the coloring agent fat mixture disperses. As the product is baked in the usual manner further dispersion occurs and on complete cooking the appearance of the product comprises red, yellow and brown flecks so as to resemble a pizza product giving this product a high degree of acceptability.

In order to more fully illustrate the present invention the following example is presented wherein all parts are by weight unless otherwise indicated.

*Example*

| Ingredient | Amount | |
|---|---|---|
| | Pounds | Ounces |
| Vegetable fat (Primex B. & C.) | 4 | 3 |
| Vegetable emulsifier (Atmul 500) | 1 | 4 |
| Oleoresin paprika (40,000 color units) | | 11 |

The specified amounts of vegetable fat and vegetable monoglyceride were placed in a suitable container and melted by the application of indirect heat. When this fat mixture was melted, the oleoresin paprika was added to the fat mixture and mixed thoroughly by stirring.

The fat mixture was allowed to solidify by placing it in a room at −22° F. for 4½ hours.

| Ingredient | Amount | |
|---|---|---|
| | Pounds | Ounces |
| Wheat flour | 46 | 1 |
| Seasonings | 42 | 3 |
| Spices | 5 | 7 |

The specified amounts of the above dry ingredients were placed in a ribbon mixer (J. H. Day Co.) which was fitted with eight stainless steel wires attached horizontally to the blades of the mixer. The stainless steel wires were approximately one mm. in diameter.

The dry ingredients were then given a preliminary mixing for five minutes.

At this point, the previously solidified fat mixture was added to the mixer and mixing was carried out for thirty minutes.

At the end of the mixing period, the resultant sauce mix product consisted of the fat-coloring mixture in combination with sauce mix ingredients as discrete aggregates measuring from about one-half millimeter to two millimeters in diameter.

The commercial retail pizza potato product is compounded in the following manner.

Ingredient: Parts by weight
    Potato slices (dehydrated) _____ 100
    Sauce mix _____ 62.8
    Large chopped onion (dehydrated) _____ 12.2

The pizza potato product is prepared for evaluation by placing the above ingredients in a 1½ quart shallow baking dish and adding one tablespoon of salad oil. One and one-half cups of hot tap water is combined with an equal amount of cold milk and then poured over the top of the potatoes and sauce mix and mixed by stirring. The product is then baked uncovered for forty minutes at 400° F.

The appearance effect of the baked product can be described as a non-uniform red-yellow-brown effect which duplicates the appearance effect of the typical tomato and cheese pizza product.

It will be understood that it is intended to cover all changes and modifications of the examples of the invention herein chosen for the purpose of illustration which do not constitute departures from the spirit and scope of the invention.

What is claimed is:

1. In a sauce mix for casseroles, aggregates measuring from about 0.3 mm. to about 5 mm. in diameter comprising a combination of a food grade coloring agent coated with a fat-emulsifier mixture, flour and flavoring ingredients, said fat and emulsifier being solids at ambient temperature and in proportion sufficient to coat the coloring agent, and said emulsifier being of food grade and containing glycerides selected from the group consisting of monoglycerides, diglycerides, and mixtures thereof.

2. In a dry sauce mix for casseroles, aggregates comprising a combination of a food grade coloring agent coated with a fat-emulsifier mixture, flour, and flavoring ingredients; the aggregates measuring from about 0.3 mm. to about 5 mm. in diameter and said fat and emulsifier being solids at ambient temperature and in proportion sufficient to coat the coloring agent, and said emulsifier being of food grade and containing glycerides selected from the group consisting of monoglycerides, diglycerides, and mixtures thereof.

3. In a dry sauce mix for potato casseroles to give the appearance of a tomato and cheese pizza product, the aggregates comprising the combination of oleoresin paprika coated with from about 6 to about 12 parts by weight for each part by weight of paprika of a vegetable fat-emulsifier mixture, flour, and flavoring ingredients, the aggregates measuring from about 0.3 mm. to about 5 mm. in diameter and said fat and emulsifier being solids at ambient temperature, and said emulsifier being of food grade and containing glycerides selected from the group consisting of monoglycerides, diglycerides, and mixtures thereof.

4. The method of making a sauce mix for casseroles, comprising the steps of coating a food grade coloring agent with a fat-emulsifier mixture, said fat and emulsifier being solids at ambient temperature, and mixing the coated agent with flour and flavoring ingredients for a time sufficient to form discrete aggregates measuring from about 0.3 mm. to about 5 mm. in diameter, and said emulsifier being of food grade and containing glycerides selected from the group consisting of monoglycerides, diglycerides, and mixtures thereof.

5. The method of making a dry sauce mix for casseroles, comprising the steps of coating a food grade coloring agent with a fat-emulsifier mixture, said fat and emulsifier being solids at ambient temperature, and mixing the coated agent with flour and flavoring ingredients for a time sufficient to form aggregates measuring from about 0.5 mm. to about 2 mm. in diameter, and said emulsifier being of food grade and containing glycerides selected from the group consisting of monoglycerides, diglycerides, and mixtures thereof.

6. The method of making a dry sauce mix for a potato casserole to give the appearance of a tomato and cheese pizza product, comprising the steps of coating oleoresin paprika with from about 6 to about 12 parts by weight for each part by weight of paprika of a vegetable fat-emulsifier mixture, said fat and emulsifier being solids at ambient temperature, and mixing the coated oleoresin paprika with flour and flavoring ingredients for a time sufficient to form aggregates measuring from about 0.3 mm. to about 5 mm. in diameter, and said emulsifier being of food grade and containing glycerides selected from the group consisting of monoglycerides, diglycerides, and mixtures thereof.

References Cited by the Examiner

UNITED STATES PATENTS

| | | | |
|---|---|---|---|
| 2,636,824 | 4/1953 | Ansel | 99—140 |
| 3,035,923 | 5/1962 | Geisler | 99—148 |
| 3,108,003 | 10/1963 | Powers | 99—148 X |
| 3,111,411 | 11/1963 | Livingston | 99—148 |

A. LOUIS MONACELL, *Primary Examiner.*

J. M. GOLIAN, *Assistant Examiner.*